S. MÖLLER.
COOLING UTENSIL.
APPLICATION FILED JAN. 5, 1917.

1,311,990.

Patented Aug. 5, 1919.

Inventor
S. Möller.
By H. R. Kerslake
Attorney

UNITED STATES PATENT OFFICE.

SUNE MÖLLER, OF GÖTTENBORG, SWEDEN.

COOLING UTENSIL.

1,311,990.  Specification of Letters Patent.  Patented Aug. 5, 1919.

Application filed January 5, 1917. Serial No. 140,862.

*To all whom it may concern:*

Be it known that I, SUNE MÖLLER, a subject of the King of Sweden, residing at Göttenborg, in the county of Göttenborg and Bohus and Kingdom of Sweden, have invented new and useful Improvements in Cooling Utensils, of which the following is a specification.

This invention refers to cooling utensils of the type wherein a receptacle of some practically non porous material such as glass or the like is suspended in an outer vessel of a rather high porosity such as stone ware, and leaving an interspace between the two vessels for the introduction of water or any other easily evaporating fluid, so that any perishable food or the like, contained in the non porous inner receptacle, may be preserved by means of the drop in temperature, that occurs when the vapor of the evaporating fluid in the interspace escapes through the pores in the outer vessel.

When using such utensils as a butter receptacle for tables, the butter knives very often are laid with their ends, coated with the butter, against the utensil and thereby soon causing the porous outer vessel to become more or less coated with the butter and thus to lose its porosity. This spoils the evaporation and cooling effect.

This invention has for its object to prevent this and to keep the porous vessel always in a perfect state of function, thus increasing considerably the usefulness of the utensil. This object I attain by providing the non porous inner receptacle with a projecting flange, extending externally and above the upper portion of the outer, porous vessel whereby said flange protects the porous vessel from being touched by the greased implements or butter knives.

Figure 1:
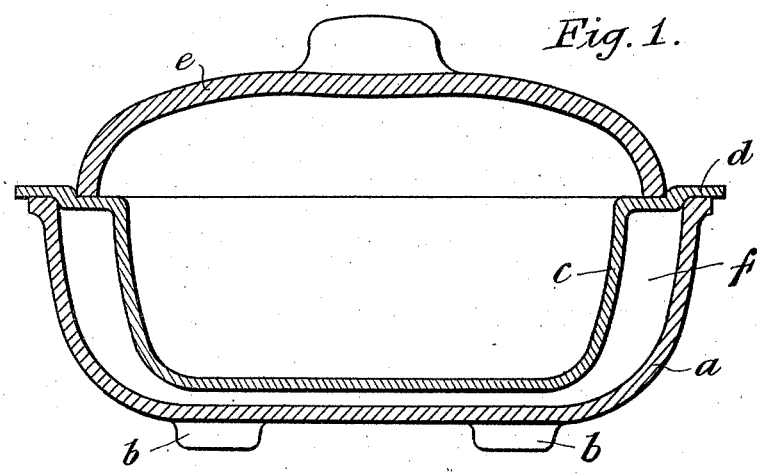
Figure 2:
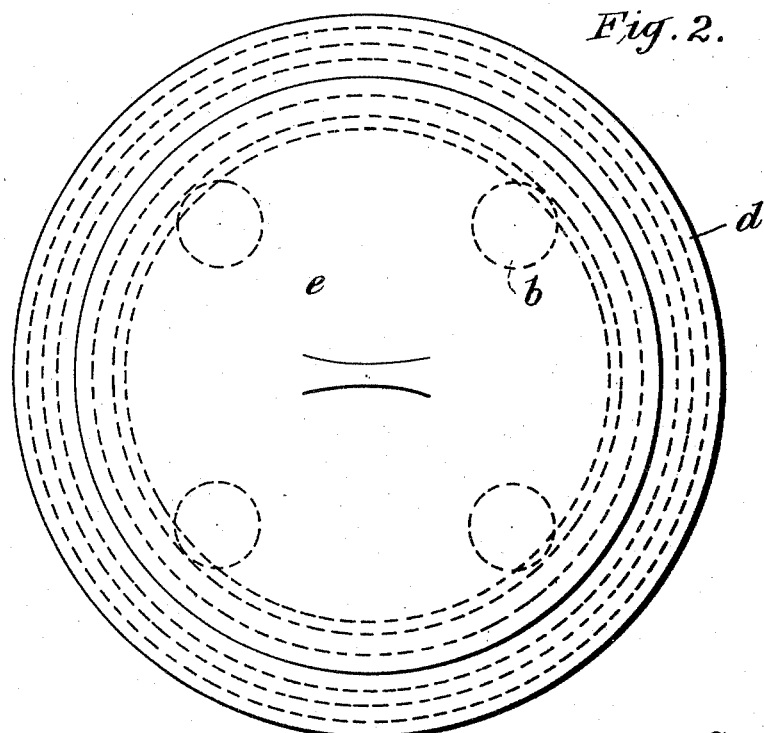

In the accompanying drawing Figure 1 shows an elevated section through a cooling utensil in accordance with this invention, and Fig. 2 a plan view of the same.

$a$ designates the outer vessel of some porous material such as stone ware, and supported by legs $b$ which permit the air to come in contact with the porous vessel all around and thus to increase the evaporation through the walls of the porous vessel. $c$ is the inner receptacle, manufactured of glass or other practically non porous material which receptacle is suspended from the upper edge of the outer vessel $a$ by means of an outwardly directed flange $d$. The inner receptacle $c$ is closed by a cover $e$ and it is of a less diameter as well as height than the cavity in the outer vessel $a$, so that an interspace $f$ for receiving the easily evaporating fluid is left all around the bottom and sides of the receptacle $c$.

The flange $d$ projects externally above the upper portion of the walls of the outer vessel, such that the butter knives, or other fat coated implements, when laid against the utensil, receive their support from said projecting flange $d$ and not directly from the porous walls of the vessel $a$ proper, thus protecting the porous vessel from being pasted with the greasy substance.

It is of course not necessary that the flange $d$ form an integral part of the inner receptacle $c$, but said flange can constitute a separate piece of some suitable material, provided the flange $d$ fulfils the above mentioned requirement of projecting externally above the porous outer vessel.

Having thus described my said invention what I claim is:

A cooling utensil comprising in combination an outer porous vessel and an inner non-porous receptacle carried by said outer vessel and spaced therefrom so as to permit the insertion of a fluid between them and having a non-porous flange projecting outwardly beyond the wall of the outer porous vessel for preventing the contents of the inner receptacle from reaching the outer vessel.

In testimony whereof I have affixed my signature in presence of two witnesses.

SUNE MÖLLER.

Witnesses:
CRUSIA ISERT,
ALEX. FUGELBURG.